US006809854B2

(12) United States Patent
Yamamoto et al.

(10) Patent No.: US 6,809,854 B2
(45) Date of Patent: Oct. 26, 2004

(54) IMAGE DISPLAY MEDIUM AND IMAGE FORMING DEVICE

(75) Inventors: Yasuo Yamamoto, Minamiashigara (JP); Satoshi Hiraoka, Minamiashigara (JP); Kiyoshi Shigehiro, Ashigarakami-gun (JP); Yoshinori Machida, Ashigarakami-gun (JP); Takeshi Matsunaga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 406 days.

(21) Appl. No.: 10/080,689

(22) Filed: Feb. 25, 2002

(65) Prior Publication Data

US 2003/0043335 A1 Mar. 6, 2003

(30) Foreign Application Priority Data

Aug. 21, 2001 (JP) ...................................... 2001-250342

(51) Int. Cl.[7] ......................... G02B 26/00; G09G 3/00; G09G 3/20; G09G 3/34

(52) U.S. Cl. ......................... 359/296; 345/107; 345/31; 345/55

(58) Field of Search ........................... 359/296; 345/30, 345/31, 55, 84, 107, 105; 204/450, 600; 252/572

(56) References Cited

U.S. PATENT DOCUMENTS 6,113,810 A * 9/2000 Hou et al. .................. 252/572
6,636,186 B1 * 10/2003 Yamaguchi et al. .......... 345/31
6,741,387 B2 * 5/2004 Shigehiro et al. ........... 359/296

FOREIGN PATENT DOCUMENTS

JP A 2001-312225 11/2001

OTHER PUBLICATIONS

Jo et al., "New Toner Display Device (1)—Image Display Using Conductive Toner and Charge Transport Layer –", Japan Hardcopy 1999, pp. 249–252. (w/abstract).
Jo et al. "Electronic reflective display using particle movement in electric field (1)—Principle and characteristic of display –", Scholarly Journal of the Image Society of Japan, vol. 39, No. 4, 2000, pp. 408–413. (w/abstract).

* cited by examiner

*Primary Examiner*—Loha Ben
(74) *Attorney, Agent, or Firm*—Oliff & Berridge, PLC

(57) ABSTRACT

An image display medium comprising a pair of substrates disposed opposed to each other and a group of at least two kinds of particles enclosed in the gap between the pair of substrates, at least one of the two or more kinds of particles being capable of being positively charged and at least the others being capable of being negatively charged and the particles capable of being positively and negatively charged having different colors, wherein both the particles capable of being positively and negatively charged have a shape factor of from greater than 100 to not greater than 140 as determined by the following equation:

$$\text{Shape factor}=(L^2/S)/4\pi\times 100$$

where S is the area of particle; and L is the perimeter of particle, and an image forming device comprising same.

4 Claims, 6 Drawing Sheets

IMAGE DISPLAY MEDIUM AND IMAGE FORMING DEVICE

BACKGROUND OF THE INVENTION

1. Field of the Invention

The present invention relates to an image display medium using a particulate material which allows repeated rewriting and an image forming device.

2. Description of the Related Art

As image display media enabling rewriting there have heretofore been proposed display techniques such as twisting ball display (two-color particle rotary display), electrophoresis, magnetophoresis, thermal rewritable medium and liquid crystal having memory properties. These display techniques are excellent in image memory properties but are disadvantageous in that they cannot use a white display such as paper and thus provide a low contrast.

As a display technique using a toner which solves these problems, there has been proposed a display technique involving the enclosure of an electrically-conductive colored toner and a white particulate material in the gap between opposing electrode substrates. In accordance with this display technique, electric charge is injected into the electrically-conductive colored toner via a charge-transporting layer provided on the inner surface of the electrode on the non-display substrate. The electrically-conductive colored toner into which electric charge has been injected moves toward the display substrate disposed opposed to the non-display substrate under the application of an electric field across the electrode substrates. The electrically-conductive colored toner is then attached to the inner side of the display substrate to make contrast from the white particulate material, causing image display (Japan Hardcopy'99 Bulletin, pp. 249–252). In this display technique, the image display medium is entirely composed of a solid material. Thus, this display technique is excellent in that the display of white and black (color) can be theoretically switched by 100%. However, this display technique is disadvantageous in that there is an electrically-conductive colored toner which doesn't come in contact with the charge-transporting layer provided on the inner surface of the electrode on the non-display substrate or an electrically-conductive colored toner isolated from other electrically-conductive colored toner. Since no electric charge is injected into these electrically-conductive colored toners, they cannot move even under the action of an electric field and thus remain at random on the substrates, giving a low contrast.

In order to solve these problems, Japanese Patent Application No. 2000-165138 proposes an image display medium comprising a pair of substrates and a plurality of kinds of particles having different colors and chargeabilities enclosed in the gap between the substrates such that they can move between the substrates under the application of an electric field applied across the substrates. In accordance with this proposal, a high whiteness degree and contrast can be attained. The applied voltage required for the display of black-and-white image is several hundreds volt. In the constitution of the particulate materials thus proposed, the required applied voltage is lowered, making it possible to expand the degree of freedom of design of the driving circuit. However, under the recent circumstances requiring further improvements of performance, further improvements of performance have been demanded. Thus, it has been desired to lower the required driving voltage for the purpose of further enhancing the stability and uniformity of image density, the stability of density contrast and the degree of freedom of design of driving circuit.

The invention is intended to solve the problems of the related art and attain the following aim. In other words, an object of the invention is to provide an image display medium which can use a low predetermined driving voltage and shows a small change of image density and image uniformity and a stable density contrast even after prolonged repetition of rewriting and an image forming device therefor.

SUMMARY OF THE INVENTION

The inventors made extensive studies. The inventors paid attention to instabilization of charged amount due to the increase of adhesion between particles and between particles and substrate or triboelectrification of particles and deterioration of efficiency in separation and movement of particles due to fluidity of group of particles charged by mutual friction. As a result, it was found that the foregoing problems can be solved by eliminating these factors. The invention has thus been worked out. According to the invention there is provided an image display medium having a pair of substrates disposed opposed to each other, and a particle group having at least two kinds of particles enclosed in a gap between the pair of substrates, in which at least one of the at least two kinds of particles can be positively charged, at least another one of the at least two kinds of particles can be negatively charged, the one and the another one have different colors from each other, and both the one and the another one has shape factors satisfying 100<the shape factors≦140, where the shape factor=$(L^2/S)/4\pi\times100$; S is area of the particle; and L is perimeter of the particle.

In the invention, it is important that the particles capable of being positively and negatively charged have different colors. The shape factor of at least one of the particulate material is also important. By making such an arrangement that the two particulate materials have different colors, a density contrast can be developed across an image site having the group of particles capable of positively charged and an image site composed of the group of particles capable of negatively charged. Further, by setting the shape factor to the above defined range, a proper space occur between the particles to enhance the fluidity of the group of particles, making it possible to give a sharp distribution of triboelectricity of the particles capable being positively and negatively charged. On the other hand, the adhesion between the particles and the substrate due to the contact of the particles with the substrate having the polarity being opposite to charge of the particles decreases because a proper space exists between the positive and negative particles. In this arrangement, even prolonged repetition of rewriting, the change of image density is small and the change of density uniformity is small, making it possible to display an image having a stabilized density contrast and reduce the driving voltage required for image display.

In the image display medium of the invention, it is preferable that one of the one, which can be positively charged, and the another one, which can be negatively charged, is white. By making at least one of the particulate materials white, the coloring power and density contrast of the other particulate material can be enhanced. It is also preferable that the one, which is white, comprises a coloring material and that the coloring material is titanium oxide. In other words, the white particulate material preferably comprises a coloring material and the coloring material is preferably titanium oxide. The use of titanium oxide makes it possible to enhance the opacifying power and hence further enhance the contrast in the wavelength range of visible light.

On the other hand, the image forming device of the invention is an image forming device for forming an image on the foregoing image display medium of the invention, the image forming device has an electric field generating unit for generating an electric field between the pair of substrates according to the image to be formed.

DETAILED DESCRIPTION OF THE PREFERRED EMBODIMENTS

Figure 1:
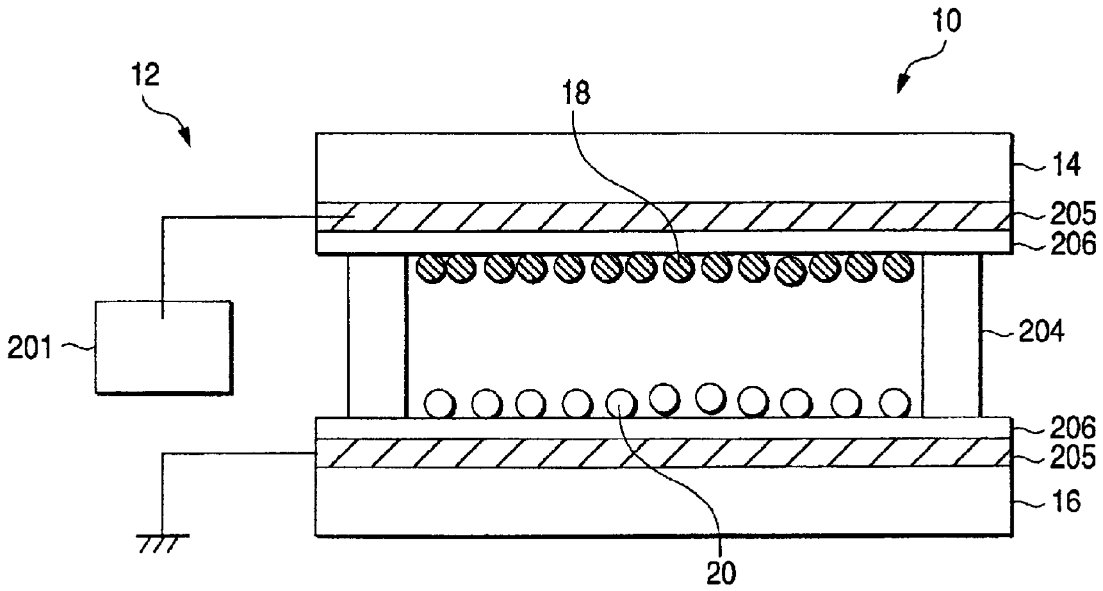
FIG. 1 is a schematic diagram illustrating the structure of an image forming device according to the first embodiment of implication of the invention.

The invention will be further described hereinafter.

[Operating Mechanism of the Invention]

The operating mechanism of the invention will be first described.

At least two particulate materials to be enclosed in the gap between a pair of substrates disposed opposed to each other are mixed at a predetermined ratio in an agitating vessel where they are then stirred. It is thought that during this mechanical agitation, triboelectrification occurs between the particles and between the particles and the inner wall of the vessel, causing the particles to be charged. Thereafter, the particles thus mixed are enclosed in the gap between the pair of substrates such that a predetermined volume packing is reached. The particles thus enclosed in the gap move back and forth between the substrates according to the electric field when the polarity of d.c. voltage applied across the pair of substrates is switched or an a.c. voltage is applied across the pair of substrates (initializing step). It is thought that even during the initializing step, the particles collide with each other and with the surface layer on the substrate to undergo triboelectrification. Further, this initializing step makes it possible to attain desired triboelectrification.

This triboelectriciation causes at least one of the particulate materials to be positively charged (hereinafter referred to as "first particulate material") and at least one of the others to be negatively charged (hereinafter referred to as "second particulate material"). Thus, the resulting Coulomb force between the first particulate material and the second particulate material can cause these particles to be attached to each other and agglomerated. However, if the electrostatic force acting on the individual particles which have been charged in the electric field applied across the substrates is stronger than the Coulomb force between the first particulate material and the second particulate material and the imaging power (mirror image power) or the van der Waals force between the particles and the substrate, the first particulate material and the second particulate material separate from each other and each move toward the respective substrate having the polarity opposite to its polarity of charge. Accordingly, it is thought that when an electric field is applied across the substrates according to the image signal, the first particulate material and the second particulate material move according to the electric field and are then attached to different substrates. It is further thought that the charged particles attached to the substrates are fixed to the substrates by the imaging power occurring between the particles and the surface layer on the substrates or the van der Waals force between the particles and the substrate.

When each of particulate materials has a high chargeability, the cohesive force between the first particulate material and the second particulate material is too high to cause these particulate materials to be separated. Further, particles having a high chargeability can be easily attached to the surface of the substrate. It is thus much likely that these particles can stay and be fixed to the surface of the substrate even under the application of an electric field. Moreover, when highly chargeable agglomerated particles are separated, local discharge can occur, giving unstable chargeability. On the contrary, particles having a low chargeability can individually be hardly affected by the external electric field and thus can stay and keep mildly agglomerated.

As can be seen in the foregoing description, it is important for each of particulate materials to have triboelectric properties, i.e., proper charge amount and presence of little particles charged opposite polarity for the purpose of causing particles to have opposite polarities to each other to be separated and moved under the application of an external electric field.

When the polarity of the electric field is then switched to move repeatedly the particles, the resulting friction between the particles and between the particles and the surface of the substrates causes the increase of the chargeability of the particles, resulting in the agglomeration of the particles or causing the particles to be fixed to the surface layer on the substrates and hence preventing the particles from being separated therefrom. The range of the charged amount of the particles which cause uneven image is broad from low to high. Accordingly, it is thought important that the change of the chargeability of the particles be small to keep the initial operating conditions.

As a method for controlling chargeability there may be used a method which comprises allowing finely divided inorganic oxide particles or finely divided resin particles to be present on the surface of particles to control the chargeability thereof. However, the collision or rubbing between the first particulate material and the second particulate material causes these finely divided particles to move toward the counterpart particles (first particulate material or second particulate material) and/or toward the transparent electrode substrate, resulting in the drop of charged amount. Further, the change of the fluidity of powder causes the drop of display contrast.

The prevention of the change of the positional relationship between the surface of the first particulate material or second particulate material and the finely divided particles is essential for the maintenance of the chargeability and fluidity of the first particulate material or second particulate material.

In the invention, the foregoing problems are solved by predetermining the shape factor of both the first and second particulate materials to a specific range. In other words, by predetermining the shape factor $((L^2/S)/4\pi\times100)$ of the particulate materials capable of being positively and negatively charged so as to meet 100<the shape factor≦140, the fluidity of the particles can be enhanced, making it possible to unify the distribution of charge and improve the stability of chargeability and the speed at which oppositely charged particles separate from each other during display (display responce) and display contrast. Accordingly, the image display medium of the invention requires a low driving voltage and can provide a small change of image density and density uniformity and a stabilized density contrast even after prolonged repetition of rewriting.

While the foregoing description has been made with reference to the case where there are one first particulate material capable of being positively charged and one second particulate material capable of being negatively charged, there may be one or more such first and second particulate materials. Even when there are two or more such first and second particulate materials, a similar mechanism of operation makes the effect of the invention possible.

[Constitution of Particulate Material of the Invention]

The particulate materials of the invention (hereinafter, "the particulate materials of the invention" is a generic term for both the particulate materials capable of being positively and negatively charged) have a shape factor $(=(L^2/S)/4\pi\times100$, in which S is the area of particle and L is the perimeter of particle) so as to meet 100<the shape factor≦140, preferably to meet 105≦the shape factor≦130, more preferably to meet 110≦the shape factor≦125. When the shape factor of the particulate materials is 100, there is no unevenness on the surface of the particulate materials, causing an increase of the adhesion between the particles or between the particles and the surface of the substrates. Further, the resulting triboelectrification between the particles causes the instabilization of charged amount or expansion of charge distribution (distribution of electrification). Moreover, the fluidity of the particles charged by friction lowers, deteriorating the efficiency in separation and movement of particles and hence raising the required driving voltage. On the contrary, when the shape factor of the particulate materials exceeds 140, since there are too large unevenness on the surface of the particulate materials, the collision between the particles developed when the powder (particles) move during repeated display causes the surface unevenness to be easily removed (destroyed), expanding the distribution of particle size and hence the distribution of electrification is expanded and thus the displayed image is deteriorated.

The shape factor is an index of the shape properties of a toner defined by the equation:

$$\text{Shape factor}=(L^2/S)/4\pi\times100$$

For the determination of shape factor, the particle is observed on scanning electron microphotograph (SEM). Using an image analyzer (Luzex, produced by Nireco Corporation), the area (S) and perimeter (L) of the particle are then determined from the electron microphotograph of the particle. The shape of the particle is then quantified by the foregoing equation.

The particulate material according to the invention is normally formed by at least a coloring material and a resin. If necessary, the particulate material of the invention may include a charge control agent. The coloring material may also act as a charge control agent.

Examples of the coloring material employable herein will be given below.

Examples of black coloring material include organic and inorganic dye-based and pigment-based black coloring materials such as carbon black, titanium black, magnetic powder and oil black.

Examples of white coloring material include white pigments such as rutile type titanium oxide, anatase type titanium oxide, zinc white, white lead, zinc sulfide, aluminum oxide, silicon oxide and zirconium oxide.

Other examples of chromatic coloring materials employable herein include phthalocyanine-based, quinacridone-based, azo-based, condensed, insoluble lake pigment, and inorganic oxide-based dye and pigments. Specific examples of these dyes and pigments which can be preferably used herein include aniline blue, chalcoyl blue, chrome yellow, ultramarine blue, Du Pont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. blue 15:1, and C.I. pigment blue 15:3.

One of the two particulate materials of the invention is preferably white. In other words, one of the two particulate materials of the invention preferably contains a white coloring material. By making one of the two particulate materials white, the colorability and density contrast of the other particulate materials can be improved. As the white coloring material for making one of the two particulate materials white there is preferably used titanium oxide. By using titanium oxide as a coloring material, the opacifying power of the particulate material in the wavelength of visible light can be raised to further enhance the density contrast. As the white coloring material there is preferably used rutile type titanium oxide in particular.

However, the invention is not limited to the case where one of the two particulate materials of the invention is white. For example, one of the two particulate materials of the invention may be black. This arrangement is useful particularly for the case where black letters and other color letters or signs are exchanged for display.

Examples of the coloring material which also acts as a charge control agent include coloring materials having an electrophilic group or electron donating group, and metal complex. Specific examples of these coloring materials include C.I. pigment violet 1, C.I. pigment violet 3, C.I. pigment violet 23, and C.I. pigment black 1.

The amount of the coloring material to be added is preferably from 1 to 60% by mass, more preferably from 5 to 50% by mass based on the total mass of the particulate material supposing that the specific gravity of the coloring material is 1.

Examples of the resin constituting the particulate material include polyvinyl resins such as polyolefin, polystyrene, acrylic resin, polyacrylonitrile, polyvinyl acetate, polyvinyl alcohol, vinyl chloride and polyvinyl butyral, vinyl chloride-vinyl acetate copolymers, styrene-acrylic acid copolymers, straight silicon resins made of organosiloxane bond, modification products thereof, fluororesins such as polytetrafluoroethyelene, polyvinyl fluoride and polyvinylidene fluoride, polyester, polyurethane, polycarbonate, amino resins, and epoxy resins. These resins may be used singly or in admixture. These resins may have been crosslinked. As the resin employable herein there may be used any binder resin which has heretofore been known as a main component for electrophotographic toner without any problem. In particular, a resin containing a crosslinked component is preferably used.

The particulate material of the invention may comprise a charge control agent incorporated therein to control its chargeability as necessary. As the charge control agent there may be used any charge control agent which is used in electrophotographic toner material. Examples of such a charge control agent include quaternary ammonium salts such as cetylpyridyl chloride and P-51 and P-53 (produced by Orient Chemical Industries, Ltd.), salicylic acid-based metal complexes, phenolic condensation products, tetraphenyl-based compounds, particulate metal oxide, and particulate metal oxide surface-treated with various coupling agents.

The charge control agent is preferably colorless or has a low coloring power or the same color as that of the entire particulate material in which it is incorporated. When the charge control agent to be used is colorless or has a low coloring power or the same color as that of the entire particulate material in which it is incorporated (i.e., same as the color of the coloring material incorporated in the particulate material), the impact on the color hue of the particulate material selected can be reduced.

The term "colorless" as used herein is meant to indicate that the material has no color. The term "low coloring power" as used herein is meant to indicate that the material has little effect on the color of the entire particulate material. The term "same color as that of the entire particulate material in which it is incorporated" as used herein is meant to indicate that the material itself has a color hue which is the same as or close to that of the entire particulate material in which it is incorporated, demonstrating that it has little effect on the color of the entire particulate material in which it is incorporated. For example, in the particulate material containing a white pigment as a coloring material, the white charge control agent is included in the category of the charge control agent having the "same color as that of the entire particulate material in which it is incorporated". Anyway, the color of the charge control agent maybe such that the color of the entire particulate material in which it is incorporated is the same as the desired color regardless of which it is "colorless", has a "low coloring power" or the "same color as that of the entire particulate material in which it is incorporated".

The amount of the charge control agent to be added is preferably from 0.1 to 10% by weight, more preferably from 0.5 to 5% by weight. The size of dispersed unit of the charge control agent in the particulate material is preferably not greater than 5 $\mu$m, more preferably not greater than 1 $\mu$m as calculated in terms of volume-average particle diameter. The charge control agent may exist in compatibilized state in the particulate material.

It should be adjusted that at least one of the particulate materials of the invention (two or more particulate materials) can be positively charged while the at least the other can be negatively charged. However, when different kinds of particles collide or rub with each other to cause electrification, one of the particulate materials is positively charged while the other is negatively charged due to the positional relationship between the charged arrangement of the two particulate materials. Therefore, by properly selecting the charge control agent, the position of the charged arrangement can be properly adjusted.

The particulate material of the invention preferably further comprises a resistivity adjustor incorporated therein. The use of such a resistivity adjustor makes it possible to expedite the exchange of charge between the particulate materials and hence attain early stabilization of the device. The term "resistivity adjustor" as used herein is meant to indicate an electrically-conductive particulate material, preferably an electrically-conductive particulate material which causes properly charge exchange or charge leakage. The presence of the resistivity adjustor makes it possible to avoid prolonged friction of particles and increase of charged amount of particles due to friction between particles and substrate, i.e., so-called charge-up.

As the resistivity adjustor there is preferably used an inorganic particulate material having a volume resistivity of not greater than $1\times10^6$ Ω.cm, preferably not greater than $1\times10^4$ Ω.cm. Specific examples of the inorganic particulate material employable herein include particulate tin oxide, titanium oxide, zinc oxide, iron oxide, and particulate material coated with various electrically-conductive oxides such as titanium oxide coated with tin oxide. The resistivity adjustor is preferably colorless or has a low coloring power or the same color as that of the entire particulate material in which it is incorporated. These terms are as defined with reference to the charge control agent. The amount of the resistivity adjustor to be added is not limited so far as it doesn't impair the color of the colored particles but is preferably from 0.1 to 10% by weight.

Referring to the size of the particulate material of the invention, the particle diameter and distribution of the white particulate material and the black particulate material can be rendered almost the same to avoid the adhesion state in which a large diameter particle is surrounded by small diameter particles as in a so-called two-component developer, making it possible to obtain a high white density and black density. The coefficient of variation of particle size is preferably not greater than 15%. It is particularly preferred that the particulate material be monodisperse. Small diameter grains can be attached to the periphery of a large diameter grain to lower the color density characteristic of the large diameter grain. The contrast can vary with the mixing proportion of the white and black particulate materials. The mixing proportion of the white and black particulate materials is preferably such that the surface of the particulate materials (two particulate materials) of the invention are the same. When the mixing proportion of the two particulate materials deviates greatly from the above defined range, the color of the particulate material used in a greater mixing proportion can become loud. However, this doesn't necessarily apply in the case where it is desired that a strong color tone display and a light color tone display be made with the same color to make high contrast or where it is desired that the display be made with a color obtained by mixing two kinds of colored particles.

The particle diameter of the particulate material of the invention cannot be unequivocally defined. However, in order to obtain a good image, the volume-average particle diameter of the particulate material is preferably from about 1 to 100 $\mu$m, more preferably from about 3 to 30 $\mu$m. The distribution of particle size of the particulate material is preferably sharp, more preferably monodisperse.

The preparation of the particulate material of the invention can be accomplished by a wet process for preparing spherical particles such as suspension polymerization, emulsion polymerization and dispersion polymerization, conventional grinding and classification process for preparing amorphous particles, or the like. In order to unify the shape of the particles, heat treatment is preferably effected.

In order to unify the distribution of particle size, the particles may be subjected to classification. For example, various vibrational sieves, ultrasonic sieves, air type sieves and wet sieves, rotor classifier employing the principle of centrifugal force, wind power classifier, etc. may be used, but the invention is not limited thereto. These devices may be used singly or in combination to provide a desired distribution of particle size. In order to adjust the particle size distribution precisely, a wet sieve is preferably used.

As methods for controlling the shape of particle (shape factor) there are preferably used the following methods. For example, the so-called suspension polymerization method disclosed in Japanese Patent Laid-Open No. 1998-10775 is preferably used which comprises dissolving a polymer in a solvent, mixing the solution with a coloring agent, and then dispersing the mixture in an aqueous medium in the presence of an inorganic dispersant so that it is rendered particulate wherein the step of adding a non-polymerizable organic solvent compatible with the monomer (having little or no compatibility with the solvent) to prepare particles which are then withdrawn is selectively followed by a drying step of removing the organic solvent. As the drying method there is preferably used a freeze drying method. This freeze drying method is preferably effected at a temperature of −200° C. to −10° C. (preferably from −180° C. to −30° C.). The freeze drying method is preferably effect at a pressure of not higher than 40 Pa, particularly not higher than 13 Pa. Examples of the organic solvent employable herein include ester-based solvents such as methyl acetate and propyl acetate, ether-based solvents such as diethyl ether, ketone-based solvents such as methyl ethyl ketone, methyl isopropyl ketone and methyl isobutyl ketone, hydrocarbon solvents such as toluene and cyclohexane, and halogenated hydrocarbon solvents such as dichloromethane, chloroform and trichloroethylene. These solvents preferably can dissolve a polymer therein. These solvents preferably a water solubility of from about 0 to 30% by weight. Cyclohexane is particularly preferred on an industrial basis taking into account safety, cost and productivity.

Further, a method as disclosed in Japanese Patent Laid-Open No. 2000-292971 can be used which comprises agglomerating and coalescing small particles to provide particles having a desired particle diameter. Moreover, a method which comprises applying a mechanical impact (developed by Hybridizer (produced by Nara Machinery Co., Ltd.), Angmill (produced by HOSOKAWA MICRON CORPORATION), θ composer (produced, by Tokuju Kosakujo Co., Ltd.), etc.) to or heating a particulate material obtained by the conventional known melt-kneading, crushing or classification method can be employed to control the shape of particles.

[Structure of Substrate of the Invention]

The image display medium comprises a pair of substrates opposed to each other. The particulate materials of the invention are enclosed in the gap between the pair of substrates. In the invention, the substrate is an electrically-conductive sheet-like material (electrically-conductive substrate). In order to allow the substrate to act as an image display medium, it is necessary that at least one of the pair of substrates be a transparent electrically-conductive substrate. In this case, the transparent electrically-conductive substrate acts as a display substrate.

As the electrically-conductive substrate there may be used a substrate which itself is electrically-conductive or an insulating support the surface of which has been electrically-conducted regardless of which it is crystalline or amorphous. Examples of the electrically-conductive substrate which itself is electrically-conductive include metal such as aluminum, stainless steel, nickel and chromium, crystalline alloy thereof, and semiconductor such as Si, GaAs, GaP, GaN, SiC and ZnO.

Examples of the insulating support employable herein include polymer film, glass, quartz, and ceramics. The electrically-conduction of the insulating support can be accomplished by subjecting the insulating support to vacuum evaporation, sputtering, ion plating or the like with the metal described with reference to the case of the electrically-conductive substrate which itself is electrically-conductive or gold, silver, copper or the like.

As the transparent electrically-conductive substrate there may be used an electrically-conductive substrate having a transparent electrode formed on one side of an insulating transparent support or a transparent support which itself is electrically-conductive. Examples of the transparent support which itself is electrically-conductive include transparent electrically-conductive materials such as ITO, zinc oxide, tin oxide, lead oxide, indium oxide and copper iodide.

Examples of the insulating transparent support employable herein include transparent inorganic materials such as glass, quartz, sapphire, MgO, LiF and $CaF_2$, film or sheet of transparent organic resins such as fluororesin, polyester, polycarbonate, polyethylene, polyethylene terephthalate and epoxy, optical fiber, SELFOC optical plate, etc.

As the transparent electrode to be provided on one side of the transparent support there may be used a transparent layer developed by vacuum evaporation, ion plating, sputtering or the like with a transparent electrically-conductive material such as ITO, zinc oxide, tin oxide, lead oxide, indium oxide and copper iodide or a layer which has been developed by vacuum evaporation or sputtering with a metal such as Al, Ni and Au to a thickness small enough to attain semitransparency.

In a further preferred embodiment of these substrates, the opposing surface of these substrates are provided with a protective layer having proper surface conditions because they have effect on the polarity of charge of the particles. The protective layer can be selected mainly from the standpoint of adhesion to the substrate, transparency, charged arrangement and surface stainability. Specific examples of the protective layer material employable herein include polycarbonate resin, vinyl silicone resin, and fluorine-containing resin. The resin to be used herein may be selected from the standpoint of the constitution of the main monomer of the particulate material. Further, a resin having a small difference in triboelectricity from the particulate material may be selected.

[Embodiments of the Image Forming Device]

Embodiments of the image forming device of the invention using the image display medium of the invention will be further described with reference to the attached drawings. In the various drawings, where the parts function in the same way, the same reference numerals are assigned. The description of these parts may be omitted.

First Embodiment

FIG. 1 illustrates an image display medium according to the present embodiment and an image forming device for forming an image on the image display medium.

The image forming device 12 according to the first embodiment comprises a voltage applying unit 201 as shown in FIG. 1. The image display medium 10 comprises a spacer 204, a black particulate material 18 and a white particulate material 20 enclosed in the gap between a display substrate 14 disposed on the image display side and a non-display substrate 16 disposed opposed to the display substrate 14. The display substrate 14 and the non-display substrate 16 are each provided with a transparent electrode 205 as described later. The transparent electrode 205 on the non-display substrate 16 is grounded. The transparent electrode 205 on the display substrate 14 is connected to the voltage applying unit 201.

The image display medium 10 will be further described hereinafter.

As the display substrate 14 and non-display substrate 16, which constitute the outside of the image display medium 10, there are used, e.g., 7059 glass substrate with a transparent electrode ITO having a size of 50 mm×50 mm×1.1 mm. The inner surface 206 of the glass substrate with which the particle material comes in contact is coated with a polycarbonate resin (PC-Z) to a thickness of 5 μm. A silicon rubber plate 204 having a size of 40 mm×40 mm×0.3 mm is cut at the center thereof by a 15 mm×15 mm square to form a space therein. The silicon rubber plate thus cut is disposed on the non-display substrate 16. For example, a spherically particulate white material 20 containing titanium oxide having a volume-average particle diameter of 20 μm and a spherically particulate black material 18 containing carbon having a volume-average particle diameter of 20 μm are mixed at a weight ratio of 2:1. About 15 mg of the mixture is sieved through a screen into the square space in the silicon rubber plate. Thereafter, the display substrate 14 is attached to the silicon rubber plate. The two substrates are pressed by a double clip so that the silicon rubber plate comes in contact with the two substrates to form the image display medium 10.

Second Embodiment

A second embodiment of implication of the invention will be further described in connection with the attached drawings.

Figure 2:
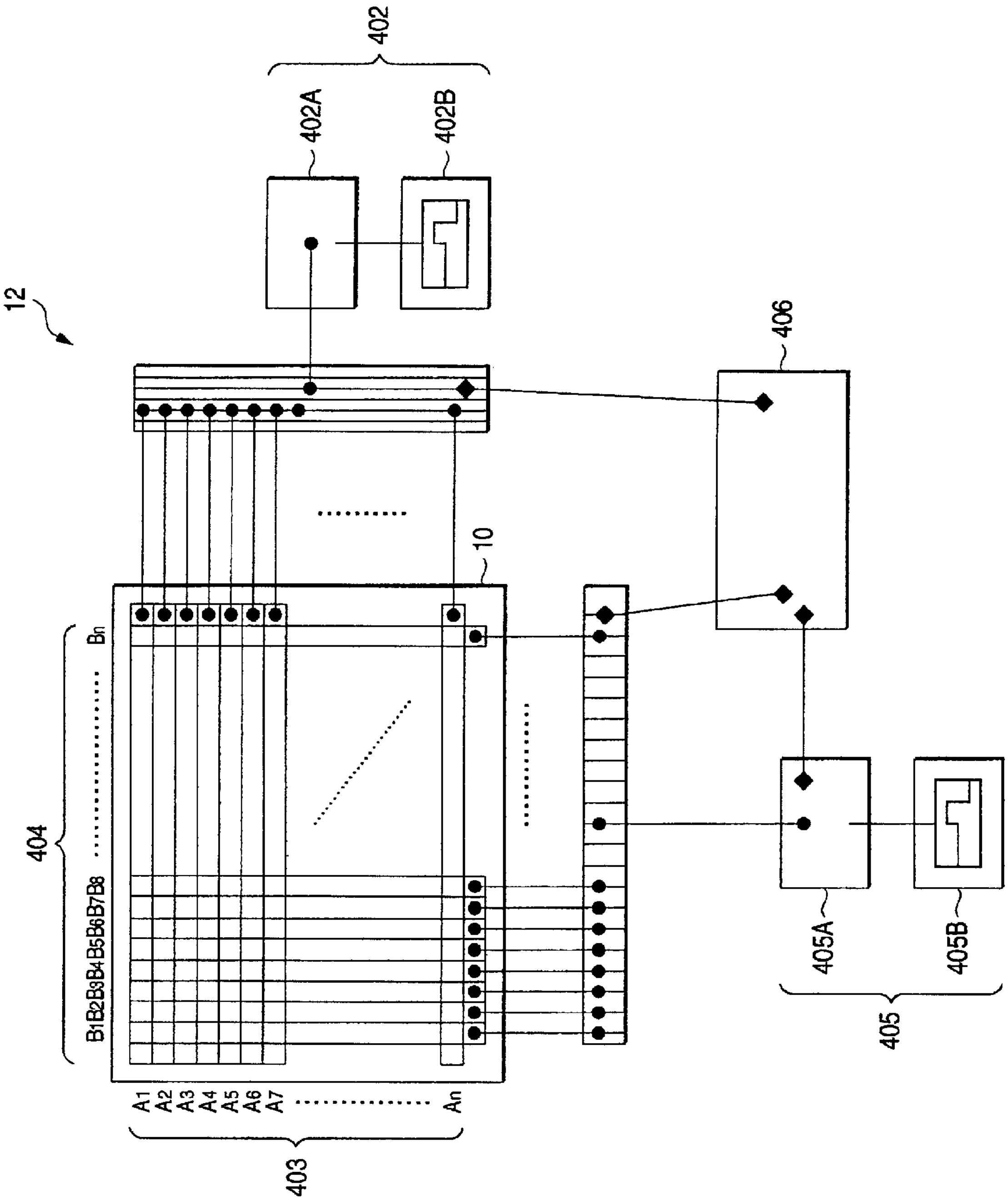
FIG. 2 is a schematic diagram illustrating the structure of an image forming device according to the second embodiment of implication of the invention.

FIG. 2 illustrates an image forming device 12 for forming an image on an image display medium 10 comprising a simple matrix according to the present embodiment. Electrodes 403An and 403Bn (n: positive integer) form a simple matrix. A plurality of particles having different chargeabilities are enclosed in the space formed by the electrodes 403An and 404Bn. An electric field generator 402 comprising a waveform generator 402B and a power supply 402A and an electric field generator 405 comprising a waveform generator 405B and a power supply 405A generates a potential on the electrodes 403An and 404Bn, respectively. A sequencer 406 controls the electrode potential drive timing to control the drive of voltage on these electrodes. In this arrangement, the electrodes 403A1 to An on one side are provided with an electric field such that the particles are driven by unit of one line at a time. The electrodes B1 to Bn on the other side are provided with an electric field according to image data at the same time on the plane.

Figure 3:
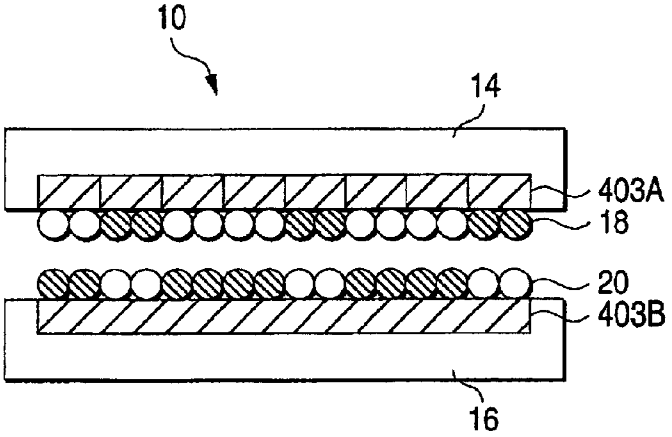
FIG. 3 is a diagram illustrating another example of the image display medium.
Figure 4:
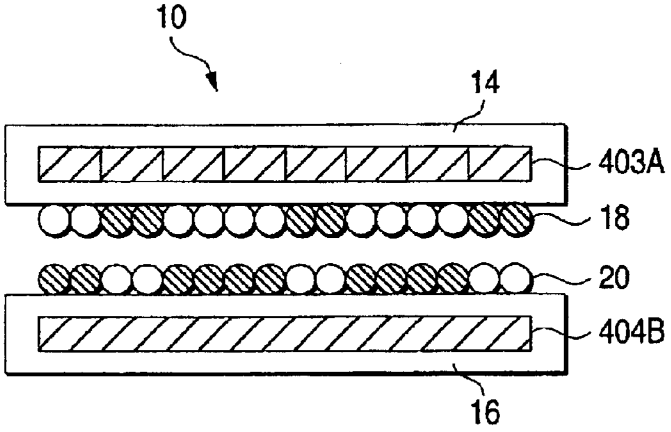
FIG. 4 is a diagram illustrating further example of the image display medium.
Figure 5:
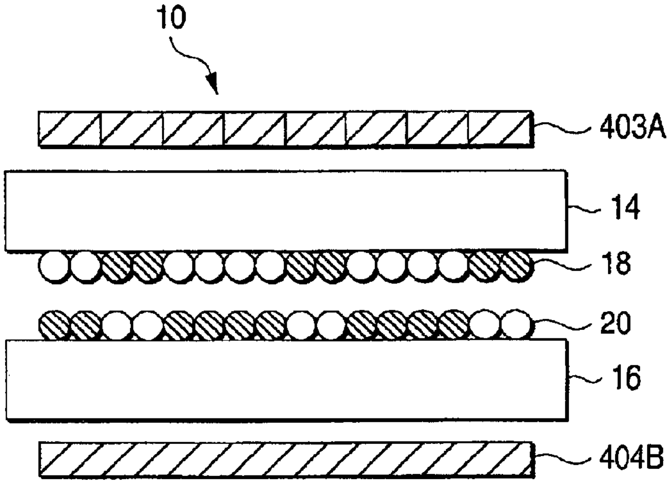
FIG. 5 is a diagram illustrating further example of the image display medium.

FIGS. 3, 4 and 5 each illustrate the view of the image forming portion of FIG. 2 on the respective arbitrary section. The particles come in contact with the surface of the electrode or substrate. The substrate is transparent on at least one side thereof so that the color of the particles can be seen from outside. The electrodes 403A and 404B may be embedded in and integrated to the respective substrate as shown in FIGS. 3 and 4 or may be separated from the respective substrate as shown in FIG. 5.

By properly setting the electric field to the foregoing device, display is enabled by the simple matrix. Any particles having a threshold value of movement with respect to electric field can be driven. Thus, the drive of particles is not restricted by the color, polarity of charging, charged amount of particles.

Third Embodiment

A third embodiment of the invention will be further described with reference to the attached drawings. The third embodiment is an image forming device comprising a print electrode.

Figure 6:
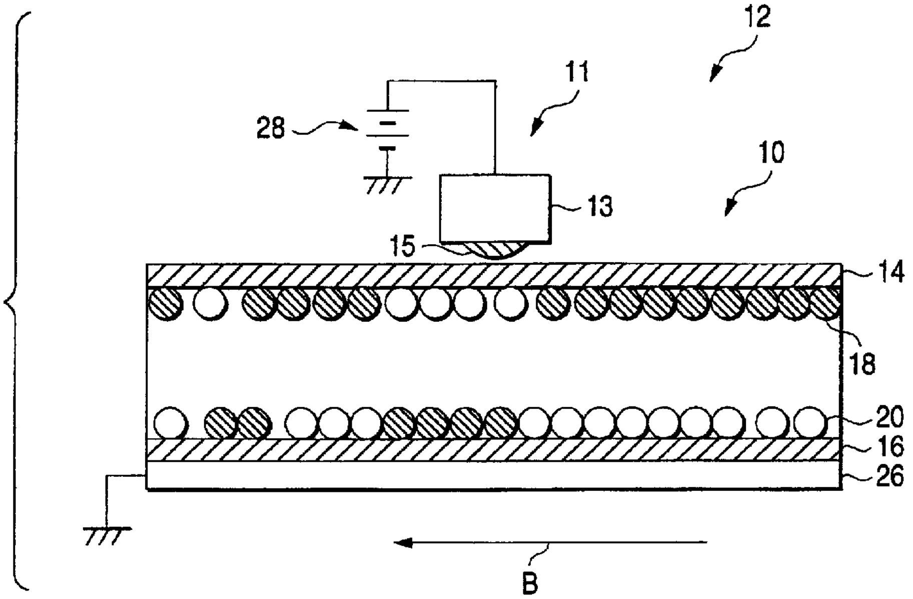
FIG. 6 is a schematic diagram illustrating the structure of an image forming device according to the third embodiment of implication of the invention.
Figure 7A:
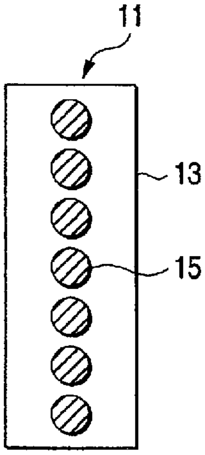
FIG. 7 is a diagram illustrating an electrode pattern on a print electrode.

As shown in FIG. 6 and FIG. 7A, the print electrode 11 comprises a substrate 13 and a plurality of electrodes 15 having a diameter of, e.g., 100 μm. The image forming device 12 comprises the print electrode 11, a counter electrode 26, a power supply 28, etc.

Figure 7B:
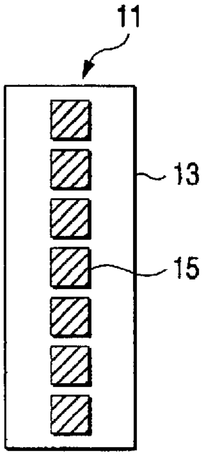
Figure 7C:
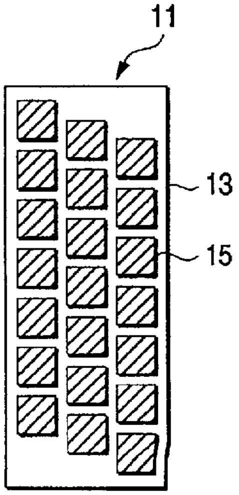
Figure 8:
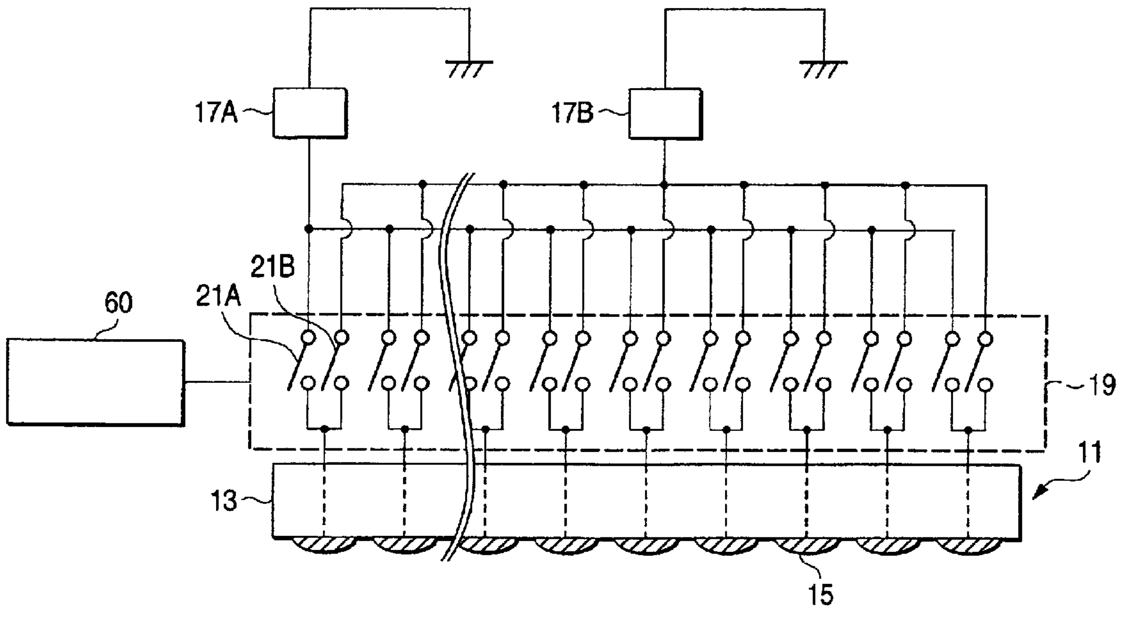
FIG. 8 is a schematic diagram illustrating the structure of the print electrode.

The plurality of electrodes 15 are arranged in a line at a predetermined interval according to the image resolution in the direction (i.e., main scanning direction) almost perpendicular to the direction of conveyance of the image display medium 10 (indicated by the arrow B) on one surface of the display substrate 14 as shown in FIG. 7A. The electrodes 15 each may be square as shown in FIG. 7B. Alternatively, the electrodes 15 may be arranged in matrix as shown in FIG. 7C.

To each of the electrodes 15 are connected an AC power supply 17A and a power supply 17B through a connection controller 19. The connection controller 19 comprises a plurality of switches composed of switches 21A each having one end connected to the electrode 15 and the other connected to the AC power supply 17A and switches 21B each having one end connected to the electrode 15 and the other connected to the DC power supply 17B.

These switches are each on-off controlled by the controller 60 to electrically connect the AC power supply 17A and the DC power supply 17B to the electrode 15. In this arrangement, an a.c. voltage or d.c. voltage or an a.c. voltage having a d.c. voltage imposed thereon can be applied to the image display medium.

The operation of the third embodiment will be described hereinafter.

Firstly, when the image display medium 10 is conveyed in the direction indicated by the arrow B by a conveying unit (not shown) into the gap between the print electrode 11 and the counter electrode 26, the controller 60 instructs the connection controller 19 to turn all the switches 21A on. In this manner, an a.c. voltage from the AC power supply 17A is applied to all the electrodes 15.

The image display medium comprises a group of two or more kinds of particles enclosed in the space between a pair of substrates not having electrode.

When an a.c. voltage is applied to the electrode 15, the black particles 18 and the white particles 20 in the image display medium 10 move back and forth between the display substrate 14 and the non-display substrate 16. The resulting friction between the particles or between the particles and the substrate causes the black particles 18 and white particles 20 to be triboelectrically charged. For example, the black particles 18 are positively charged while the white particles 20 are not charged or negatively charged. The following description will made with reference to the case where the white particles 20 are negatively charged.

The controller instructs the connection controller 19 to turn on only the switch 17B corresponding to the electrode 15 disposed according to the image data so that a d.c. voltage is applied to the electrode 15 disposed according to the image data. For example, a d.c. voltage is applied to the non-image area while a d.c. voltage is not applied to the image area.

In this manner, if a d.c. voltage is applied to the electrode 15, the black particles 18 which have been positively charged at the area where the print electrode 11 is disposed opposed to the display substrate 14 move toward the non-display substrate 16 under the action of electric field. At the same time, the white particles 20 which have been negatively charged on the non-display substrate 16 move toward the display substrate 14 under the action of electric field. Accordingly, only the white particles 20 appear on the display substrate 14 side. As a result, no image is displayed on the area corresponding to the non-image area.

On the other hand, if no d.c. voltage is applied to the electrode 15, the black particles 18 which have been positively charged at the area where the print electrode is disposed opposed to the display substrate 14 remain under the action of electric field. At the same time, the black particles 18 which have been positively charged on the non-display substrate 16 side move toward the display substrate 14 under the action of electric field. Accordingly, only the black particles 18 appear on the display substrate 14 side. As a result, an image is displayed on the area corresponding to the image area.

In this manner, only the black particles 18 appear on the display substrate 14 side. As a result, an image is displayed on the area corresponding to the image area Thus, the black particles 18 and the white particles 20 move according to the image to display an image on the display substrate 14 side. When the white particles 20 have not been charged, only the black particles 18 move under the effect of electric field. The black particles 18 on the area where no image is displayed move toward the non-display substrate 16 and are shielded by the white particles 20 on the display substrate 14 side, enabling the display of an image. Even after the electric field which has been generated across the substrates of the image display medium 10 has disappeared, the displayed image is maintained by the adhesion characteristic of particles. Since these particles can move again when an electric field is generated across the substrates, the image forming device can repeatedly display an image.

Thus, particles which have been charge with air as a medium move under the effect of electric field, providing a high safety. Further, since air has a low viscosity resistance, a high responce, too, can be attained.

Fourth Embodiment

A fourth embodiment of implication of the invention will be further described in connection with the attached drawings. The fourth embodiment is an image forming device comprising an electrostatic latent image carrier.

Figure 9:
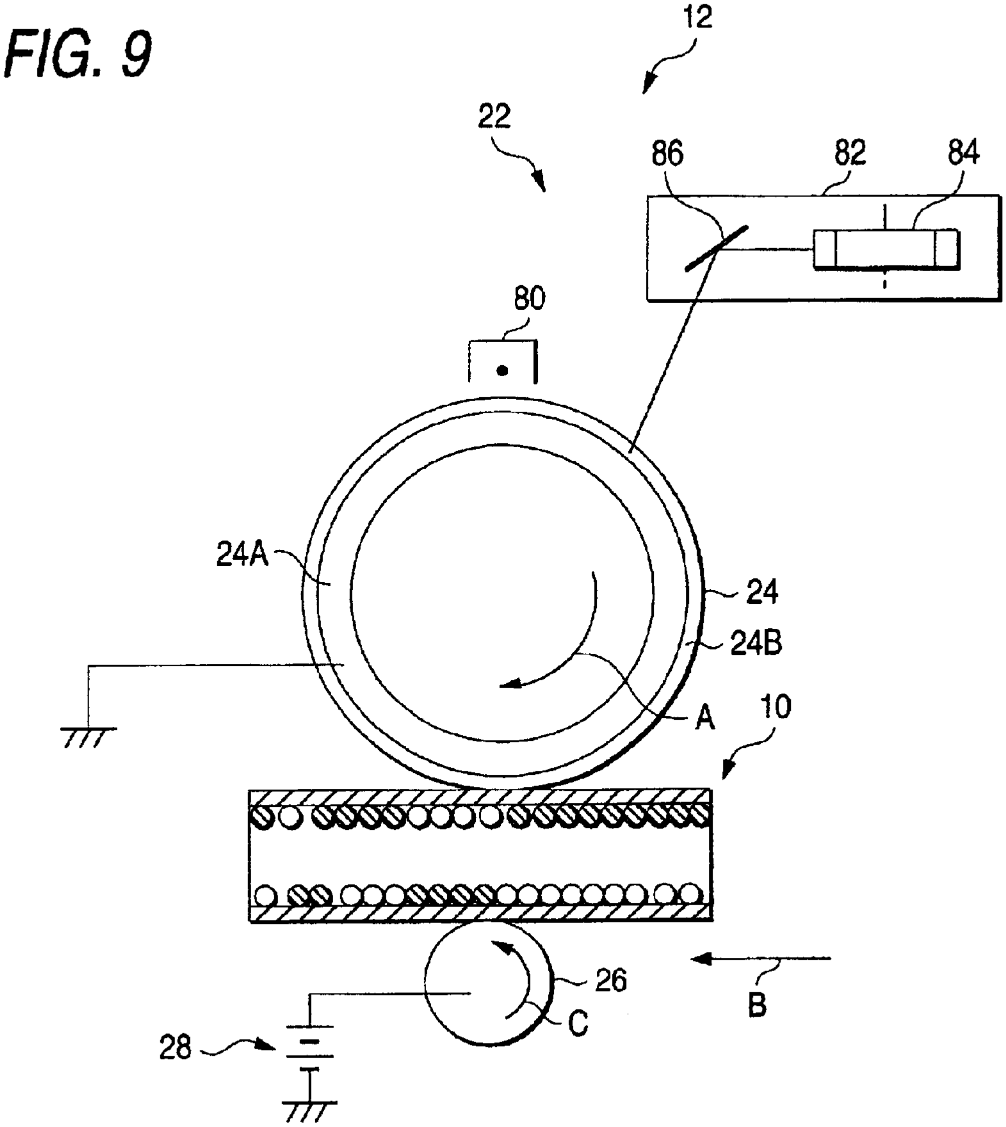
FIG. 9 is a schematic diagram illustrating the structure of an image forming device according to the fourth embodiment of implication of the invention.

FIG. 9 illustrates an image forming device 12 according to the fourth embodiment. The image forming device 12 comprises an electrostatic latent image forming portion 22, a drum-shaped electrostatic latent image carrier 24, a counter electrode 26, a d.c. voltage power supply 28, etc.

The electrostatic latent image forming portion 22 comprises a charging device 80, and a light beam scanning device 82. In this case, as the electrostatic latent image carrier 24 there may be used a photoreceptor drum 24. The photoreceptor drum 24 comprises a photo-conductive layer 24B formed on a drum-shaped electrically-conductive substrate 24A made of aluminum, SUS or the like. As the photo-conductive layer there may be used any known material such as inorganic photo-conductive material (e.g., $\alpha$-Si, $\alpha$-Se, $As_2Se_3$) and organic photo-conductive material (e.g., PVK/TNF). The formation of the photo-conductive layer can be accomplished by plasma CVD, vacuum evaporation, dipping method or the like. If necessary, the photoreceptor drum 24 may comprise a charge-transporting layer or overcoat layer formed thereon.

The charging device 80 uniformly charges the surface of the electrostatic latent image carrier 24 to a desired potential. As the charging device 80 there may be used any material which can charge the surface of the photoreceptor drum 24 to an arbitrary potential. The present embodiment employs a corotron which applies a high voltage to an electrode wire to generate a corona discharge between the electrode wire and the electrostatic latent image carrier 24 so that the surface of the photoreceptor drum 24 can be uniformly charged. Alternatively, any known charger such as electrically-conductive roll member, brush and film member may be used. A voltage is applied to such a charger in contact with the photoreceptor drum 24 to charge the surface of the photoreceptor drum.

The light beam scanning device 82 emits a minute spot light onto the surface of the electrostatic latent image carrier 24 thus charged according to the image signal to form an electrostatic latent image on the electrostatic latent image carrier 24. As the light beam scanning device 82 there may be used any device which emits light beam onto the surface of the photoreceptor drum 24 according to the image data to form an electrostatic latent image on the photoreceptor drum 24 which has been uniformly charged. In the present embodiment, a polygon mirror 84, a turning mirror 86, and an imaging optical system comprising a light source and lens (not shown) form a laser beam having a predetermined spot diameter which then scans on the surface of the photoreceptor drum 24 while being turned on and off according to the image signal. In this arrangement, ROS (Raster Output Scanner) is formed. Alternatively, an LED head comprising LED's arranged according to desired resolution may be used.

The electrically-conductive substrate 24A on the electrostatic latent image carrier 24 is grounded. The electrostatic latent image carrier 24 rotates in the direction indicated by the arrow A.

Figure 10:
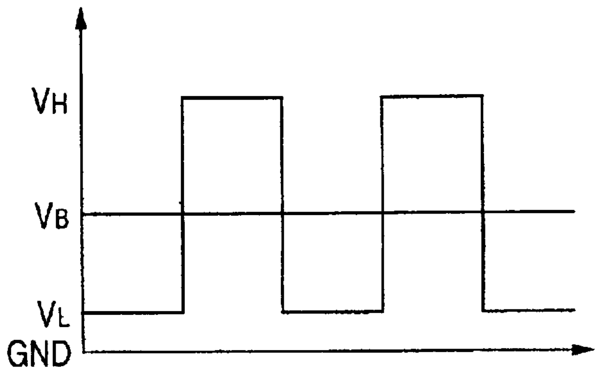
FIG. 10 is a diagram illustrating the potential of the electrostatic latent image carrier and the counter electrode.

The counter electrode 26 is formed by, e.g., an elastic electrically-conductive roll member. In this arrangement, the counter electrode 26 is allowed to come in closer contact with the image display medium 10. The counter electrode 26 is disposed with the image display medium 10 disposed interposed between the counter electrode 26 and the electrostatic latent image carrier 24. The image display medium 10 is conveyed in the direction indicated by the arrow B by a conveying unit (not shown). To the counter electrode 26 is connected a d.c. voltage power supply 28. A bias voltage VB from the d.c. voltage power supply 28 is applied to the counter electrode 26. The bias voltage $V_B$ is in between $V_H$ and $V_L$ wherein $V_H$ and $V_L$ are the potential of the area on the electrostatic latent image carrier 24 which is positively charged and the potential of the area on the electrostatic latent image carrier 24 which is not charged, respectively, as shown in FIG. 10. The counter electrode 26 rotates in the direction indicated by the arrow C.

The operation of the fourth embodiment will be described hereinafter.

When the electrostatic latent image carrier 24 begins to rotate in the direction indicated by the arrow A, the electrostatic latent image forming portion 22 forms an electrostatic latent image on the electrostatic latent image carrier 24. On the other hand, the image display medium 10 is conveyed in the direction indicated by the arrow B by a conveying unit (not shown) into the gap between the electrostatic latent image carrier 24 and the counter electrode 26.

At this time, a bias voltage $V_B$ is applied to the counter electrode 26 as shown in FIG. 10. The potential of the electrostatic latent image carrier 24 disposed opposed to the counter electrode 26 is $V_H$. In this arrangement, when the area on the electrostatic latent image carrier 24 disposed opposed to the display substrate 14 has been positively charged (non-image area) and the black particles 18 have been attached to the area on the display substrate 14 disposed opposed to the electrostatic latent image carrier 24, the black particles 18 which have been positively charged move from the display substrate 14 side to the non-display substrate 16 side so that they are attached to the non-display substrate 16. In this manner, only the white particles 20 appear on the display substrate 14 side. As a result, no image is displayed on the area corresponding to the non-image area.

On the other hand, when the area on the electrostatic latent image carrier 24 disposed opposed to the display substrate 14 has not been positively charged (image area) and the black particles 18 have been attached to the area on the non-display substrate 16 disposed opposed to the counter electrode 26, the black particles 18 which have been charged move from the non-display substrate 16 side to the display substrate 14 side so that they are attached to the display substrate 14 because the potential of the electrostatic latent image carrier 24 disposed opposed to the counter electrode 26 is $V_L$. In this manner, only the black particles 18 appear on the display substrate 14 side. As a result, an image is displayed on the area corresponding to the image area.

In this manner, the black particles 18 move according to the image data to display an image on the display substrate 14 side. Even after the electric field which has been generated across the substrates of the image display medium 10 has disappeared, the displayed image is maintained by the adhesion characteristic of particles and the mirror image power between the particles and the substrate. Since these particles can move again when an electric field is generated across the substrates, the image forming device 12 can repeatedly display an image.

Thus, since a bias voltage is applied to the counter electrode 26, the black particles 18 can be moved regardless of whichever the black particles 18 are attached to the display substrate 14 or the non-display substrate 16. Therefore, it is not necessary that the black particles 18 be previously attached to one of the substrates. Further, an image having a high contrast and a high sharpness can be formed. Moreover, particles which have been charge with air as a medium move under the effect of electric field, providing a high safety. Further, since air has a low viscosity resistance, a high responce, too, can be attained.

While embodiments of the image forming device of the invention comprising the image display medium of the invention have been described in connection with the attached drawings, the invention should not be construed as being limited thereto except for the use of the particles of the invention. Various structures may be employed according to the purpose. While the foregoing embodiments have been described with reference to the case where the combination of colors of particles are black and white, the invention should not be construed as being limited thereto. Proper combinations may be selected according to the purpose.

EXAMPLE

The invention will be further described in the following examples, but the invention should not be construed as being limited thereto. In the following examples and comparative examples, the effect of the invention was confirmed using the image display medium and image forming device according to the first embodiment (image display medium and image forming device as shown in FIG. 1) described in the foregoing paragraph [Embodiments of image forming device of the invention] with different constitutions of white particles 20 and black particles 18. The size, material and other factors of various members were similar to that described in the foregoing paragraph [Embodiments of image forming device of the invention].

(Preparation of White Particulate Material-1)

Preparation of Dispersion A

The following components were mixed, and then subjected to milling with zirconia balls having a diameter of 10 mmϕ for 20 hours to prepare a dispersion A.

<Formulation>

| | |
|---|---|
| * Cyclohexyl methacrylate | 53 parts by weight |
| * Titanium oxide (Tipaque, produced by ISHIHARA SANGYO KAISHA,LTD.) | 45 parts by weight |
| * Charge control agent (COPY CHARGE PSY VP2038, produced by Clariant Japan Co., Ltd.) | 2 parts by weight |
| * Cyclohexane | 5 parts by weight |

Preparation of Dispersion B

The following components were mixed, and then subjected to milling in the same manner as the dispersion A to prepare a dispersion B.

<Formulation>

| | |
|---|---|
| * Calcium carbonate | 40 parts by weight |
| * Water | 60 parts by weight |

Preparation of Mixture C

The following components were mixed, deaerated by means of a ultrasonic device for 10 minutes, and then stirred by means of an emulsifier to prepare a mixture C.

<Formulation>

| | |
|---|---|
| * 2% aqueous solution of CELLOGEN | 4.3 g |
| * Dispersion B | 8.5 g |
| * 20% aqueous solution of sodium chloride | 50 g |

35 g of the dispersion A, 1 g of divinylbenzene and 0.35 g of a polymerization initiator AIBN were measured out, thoroughly mixed, and then aerated by means of a ultrasonic device for 10 minutes. The mixture thus obtained was put in the mixture C, and then subjected to emulsification by means of an emulsifier. Subsequently, the emulsion thus obtained was put in a bottle which was sealed with a silicone cover. The emulsion was thoroughly deaerated through a syringe. The bottle was then filled with nitrogen gas. Subsequently, the emulsion was reacted at a temperature of 60° C. for 10 hours. After cooling, the resulting dispersion containing particles was processed by a freeze dryer at a temperature of −35° C. and a pressure of 0.1 Pa for 2 days to remove cyclohexane. The particulate material thus obtained was dispersed in ion-exchanged water. To the dispersion was then added an aqueous solution of hydrochloric acid to decompose calcium carbonate. The dispersion was then filtered. The dispersion was thoroughly washed with distilled water, and then sieved through nylon sieves having a mesh size of 20 $\mu$m and 25 $\mu$m, respectively, to classify the particle size. The dispersion was then dried to obtain a white particulate material-1 having an average particle diameter of 23 $\mu$m. The particulate material was observed on SEM photograph. As a result, the particles were observed to be spherical. The particles were also determined for shape factor. The shape factor was 107.

(Preparation of Black Particulate Material-1)

A black particulate material-1 having an average particle diameter of 23.2 $\mu$m was obtained in the same manner as the white particulate material-1 except that the following dispersion K was used instead of the dispersion A. The particulate material was observed on SEM photograph. As a result, the particles were observed to be spherical. The particles were also determined for shape factor. The shape factor was 110.

Preparation of dispersion K

The following components were mixed, and then subjected to milling with zirconia balls having a diameter of 10 mmϕ for 20 hours to prepare a dispersion K.

<Formulation>

| | |
|---|---|
| * Styrene monomer | 87 parts by weight |
| * Black pigment (Carbon black; CF9, produced by Mitsubishi Chemical Corporation) | 10 parts by weight |
| * Cyclohexane | 5 parts by weight |

(Preparation of Black Particulate Material-2)

A black particulate material-1 having an average particle diameter of 23.3 μm was obtained in the same manner as the white particulate material-1 except that the following dispersion K' was used instead of the dispersion A. The particulate material was observed on SEM photograph. As a result, the particles were observed to be spherical. The particles were also determined for shape factor. The shape factor was 102.

Preparation of Dispersion K'

The following components were mixed, and then subjected to milling with zirconia balls having a diameter of 10 mmϕ for 20 hours to prepare a dispersion K'.

<Formulation>

| | |
|---|---|
| * Styrene monomer | 87 parts by weight |
| * Black pigment (Carbon black; CF9, produced by Mitsubishi Chemical Corporation) | 10 parts by weight |
| * Cyclohexane | 2 parts by weight |

(Preparation of Black Particulate Material-3)

A black particulate material-3 having an average particle diameter of 22.2 μm was obtained in the same manner as the white particulate material-1 except that the following dispersion K" was used instead of the dispersion A and the dispersion was dried at a temperature of 30° C. and a pressure of $1.3\times10^4$ for 5 hours Pa at the step of removing cyclohexane. The particulate material was observed on SEM photograph. As a result, the particles were observed to be spherical. The particles were also determined for shape factor. The shape factor was 135.

Preparation of Dispersion K"

The following components were mixed, and then subjected to milling with zirconia balls having a diameter of 10 mmϕ for 20 hours to prepare a dispersion K".

<Formulation>

| | |
|---|---|
| * Styrene monomer | 87 parts by weight |
| * Black pigment (Carbon black; CF9, produced by Mitsubishi Chemical Corporation) | 10 parts by weight |
| * Cyclohexane | 10 parts by weight |

(Preparation of Black Particulate Material-4)

100 parts by weight of a styrene-butyl acrylate copolymer resin (glass transition point: 73° C.) and 10 parts by weight of carbon black (CF9, produced by Mitsubishi Chemical Corporation) were measured out, and then melt-kneaded under heating by means of a Banbury mixer. The mixture was roughly ground by means of a hammer mill, and then finely ground by means of a jet mill. The material was classified by means of an elbow jet, and then spheronized by means of Hybridizer (produced by Nara Machinery Co., Ltd.). The particles were then further classified to obtain a black particulate material-4 having an average particle diameter of 22.2 μm. The particulate material was observed on SEM photograph. As a result, the particles were observed to be almost spherical. The particles were also determined for shape factor. The shape factor was 143.

(Preparation of Black Particulate Material-5)

A black particulate material-5 having an average particle diameter of 21.2 μm was obtained in the same manner as the white particulate material-1 except that the following dispersion K''' was used instead of the dispersion A and the dispersion was dried at a temperature of 30° C. and a pressure of $1.3\times10^4$ Pa for 5 hours at the step of removing cyclohexane. The particulate material was observed on SEM photograph. As a result, the particles were observed to be spherical. The particles were also determined for shape factor. The shape factor was 120.

Preparation of Dispersion K'''

The following components were mixed, and then subjected to milling with zirconia balls having a diameter of 10 mmϕ for 20 hours to prepare a dispersion K'''.

<Formulation>

| | |
|---|---|
| * Styrene monomer | 89 parts by weight |
| * Black pigment (Carbon black; CF9, produced by Mitsubishi Chemical Corporation) | 8 parts by weight |
| * Cyclohexane | 8 parts by weight |

Examples 1 to 4; Comparative Example 1

A white particulate material and a black particulate material were mixed according to Table 1. The mixture was then enclosed in the gap between the opposing substrates (display substrate 14, non-display substrate 16) in the image display medium according to the first embodiment described in the foregoing embodiments and the image forming device for forming an image on the image display medium to obtain image display media of examples and comparative examples. The mixing proportion of the white particulate material to the black particulate material (by number of particles) was 2:1.

(Evaluation)

The image display media and image forming devices thus obtained were each evaluated in the following manner.

Driving Voltage

When a d.c. voltage of 135 V was applied to the transparent electrode of the display substrate 14 in the foregoing image display medium 10 having a predetermined amount of a 2:1 (by weight) mixture of the white particulate material 20 and the black particulate material 18 enclosed therein, the white particulate material 20 which have been negatively charged on the non-display substrate 16 side partly begins to move toward the display substrate 14 under the action of electric field. When a d.c. voltage (driving voltage) is then applied to the medium, most of the white particulate material 20 move toward the display substrate 14 to saturate substantially the display density. At this time, the black particulate particles 18 which have positively been charged move toward the non-display substrate 16. Even after the applied voltage was reduced to 0 V, the particles on the display substrate didn't move, causing no change of display density. The d.c. voltage applied was used as a driving voltage. This driving voltage is set forth in Table 1.

Uneven Image

As mentioned above, when a voltage is applied across the display substrate 14 and the non-display substrate 16 to allow a desired electric field to act on the group of particles, the particulate materials 18 and 20 move between the display substrate 14 and the non-display substrate 16. By switching the polarity of the voltage applied, the particulate materials 18 and 24 move in different directions between the display substrate 14 and the non-display substrate 16. By repeatedly switching the polarity of voltage, these particulate materials move back and forth between the display substrate 14 and the non-display substrate 16. During this procedure, the collision of these particles 18 and 20 and the collision of the particles 18 and 20 and the display substrate 14 or non-display substrate 16 cause the particles 18 and 20 to be charged to different polarities. The black particulate material 18 (black particulate material-1) was positively charged and the white particulate material 20 (white particulate material-1) was negatively charged. Thus, these particulate materials move in opposite directions according to the electric field across the display substrate 14 and the non-display substrate 16. When the electric field is fixed to one direction, these particulate materials 18 and 20 are each attached to the display substrate 14 or non-display substrate 16 to display a uniform image having a high density and a high contrast free of unevenness. The polarity of voltage was repeatedly switched at 16,000 cycles and a time interval of 1 second and then at 5,000 cycles and a time interval of 0.1 seconds, totaling 21,000 cycles. The resulting image was then measured for reflection density contrast and reflection density unevenness and organoleptically evaluated for uneven image.

For the organoleptical evaluation of uneven image, a densitometer X-Rite 404 was used. The measurement was made on five points in a patch having a size of 20 mm×20 mm. The dispersion of density measured at the five points was used as criterion for evaluation of uneven density. The density value averaged over the five points was used as average density of the test patch. For example, when the black reflection density measured at the five points range within ±0.05 according to this criterion, it is judged that there is little unevenness in reflection density. The results are set forth in Table 1.

TABLE 1

| | White particulate material (shape factor) | Black particulate material (shape factor) | Driving voltage | Uneven image |
|---|---|---|---|---|
| Example 1 | White particulate material-1 (107) | Black particulate material-1 (110) | 160 V | ±0.04 |
| Example 2 | White particulate material-1 (107) | Black particulate material-2 (102) | 170 V | ±0.03 |
| Example 3 | White particulate material-1 (107) | Black particulate material-3 (135) | 150 V | ±0.03 |

TABLE 1-continued

| | White particulate material (shape factor) | Black particulate material (shape factor) | Driving voltage | Uneven image |
|---|---|---|---|---|
| Example 4 | White particulate material-1 (107) | Black particulate material-5 (120) | 140 V | ±0.02 |
| Comparative Example 1 | White particulate material-1 (107) | Black particulate material-4 (143) | 150 V | ±0.08 |

As can be seen in the foregoing results, Example 1 exhibits a required driving voltage as low as 160 V. This value was almost half that required for the case where spherical particles having a shape factor of 100 were used as particles. Example 1 was good also in the organoleptical evaluation of uneven image. When Example 1 was measured for density dispersion and density change after 21,000 cycles of switching of the polarity of voltage, the density dispersion was ±0.03 and the reflection density showed a change as small as 0.05 from the initial value, demonstrating that the reflection density was stable.

It was also made obvious that Examples 2 to 4 gave results similar to that of Example 1.

On the contrary, Comparative Example 1, which uses a black particulate material-4 having a shape factor of not smaller than 140, required a high driving voltage and exhibited a rough image as evaluated for uneven image, demonstrating that no good results were obtained. When Comparative Example 1 was measured for density dispersion and density change after 21,000 cycles of switching of the polarity of voltage, the density dispersion was ±0.1 and the reflection density showed a change as great as 0.15 from the initial value, demonstrating that the reflection density was unstable.

Similar results were obtained even when the foregoing examples and comparative examples were applied to the image display media and image forming devices according to the second to fourth embodiments.

As mentioned above, the invention provides an image display medium which can use a low predetermined driving voltage and shows a small change of image density and image uniformity and a stable density contrast even after prolonged repetition of rewriting and an image forming device therefor.

What is claimed is:

1. An image display medium comprising:

a pair of substrates disposed opposed to each other; and a particle group having at least two kinds of particles enclosed in a gap between the pair of substrates, wherein at least one of the at least two kinds of particles can be positively charged;

wherein at least another one of the at least two kinds of particles can be negatively charged;

wherein the one and the another one have different colors from each other; and wherein both the one and the another one have shape factors satisfying 100<the shape factors≦140, where the shape factor=$(L^2/S)/4\pi\times100$; S is area of the particle; and L is perimeter of the particle.

2. The image display medium according to claim 1, wherein one of the one, which can be positively charged, and the another one, which can be negatively charged, is white.

3. The image display medium according to claim 2, wherein the one, which is white, comprises a coloring material; and wherein the coloring material is titanium oxide.

4. An image forming device comprising an electric field generating unit for generating an electric field between a pair of substrates according to an image to form the image on an image display medium;

wherein the image display medium comprising:

the pair of substrates disposed opposed to each other; and a particle group having at least two kinds of particles enclosed in a gap between the pair of substrates, wherein at least one of the at least two kinds of particles can be positively charged;

wherein at least another one of the at least two kinds of particles can be negatively charged;

wherein the one and the another one have different colors from each other; and wherein both the one and the another one have shape factors satisfying 100<the shape factors≦140, where the shape factor=$(L^2/S)/4\pi\times100$; S is area of the particle; and L is perimeter of the particle.

* * * * *